United States Patent
Kim et al.

(10) Patent No.: US 9,385,371 B2
(45) Date of Patent: Jul. 5, 2016

(54) POSITIVE ELECTRODE MATERIAL FOR SECONDARY BATTERY AND METHOD FOR MANUFACTURING THE SAME

(75) Inventors: Dong Gun Kim, Gyeonggi-do (KR); Sa Heum Kim, Gyeonggi-do (KR); Young Jun Kim, Gyeonggi-do (KR); Jun Ho Song, Gyeonggi-do (KR); Woo Suk Cho, Gyeonggi-do (KR); Jeom Soo Kim, Gyeonggi-do (KR)

(73) Assignees: Hyundai Motor Company, Seoul (KR); Korea Electronics Technology Institute, Seongnam, Gyeonggi-do (KR)

( * ) Notice: Subject to any disclaimer, the term of this patent is extended or adjusted under 35 U.S.C. 154(b) by 575 days.

(21) Appl. No.: 13/214,544

(22) Filed: Aug. 22, 2011

(65) Prior Publication Data

US 2012/0305855 A1    Dec. 6, 2012

(30) Foreign Application Priority Data

May 31, 2011   (KR) ........................ 10-2011-0051912

(51) Int. Cl.
| | |
|---|---|
| *H01B 1/06* | (2006.01) |
| *C01B 25/10* | (2006.01) |
| *H01M 4/58* | (2010.01) |
| *H01M 4/136* | (2010.01) |
| *H01M 4/36* | (2006.01) |

(52) U.S. Cl.
CPC ............ *H01M 4/5825* (2013.01); *H01M 4/136* (2013.01); *H01M 4/366* (2013.01); *Y02E 60/122* (2013.01); *Y02P 70/54* (2015.11)

(58) Field of Classification Search
USPC .............. 429/218.1, 231.1; 423/301; 252/506
See application file for complete search history.

(56) References Cited

U.S. PATENT DOCUMENTS

| | | | |
|---|---|---|---|
| 6,387,568 B1 * | 5/2002 | Barker et al. .............. | 429/218.1 |
| 2007/0003833 A1 | 1/2007 | Li et al. | |
| 2008/0213670 A1 * | 9/2008 | Okada et al. ............. | 429/231.95 |
| 2009/0111020 A1 * | 4/2009 | Yamaguchi et al. .......... | 429/207 |

FOREIGN PATENT DOCUMENTS

| | | |
|---|---|---|
| CN | 1703370 A | 11/2005 |
| JP | 2009-302044 A | 12/2009 |
| JP | 2010-238603 A | 10/2010 |
| JP | 2010-260761 A | 11/2010 |
| JP | 2012-209032 A | 10/2012 |
| KR | 10-2005-0029239 | 3/2005 |
| KR | 10-2005-0037485 | 4/2005 |
| KR | 10-2007-0112298 | 11/2007 |
| KR | 10-0834054 | 5/2008 |
| KR | 10-2011-0005854 | 1/2011 |
| WO | 02/44084 A2 | 6/2002 |

* cited by examiner

*Primary Examiner* — Monique Peets
(74) *Attorney, Agent, or Firm* — Mintz Levin Cohn Ferris Glovsky and Popeo, P.C.; Peter F. Corless (57) ABSTRACT

A positive electrode material for a secondary battery and a method for manufacturing the same are provided, in which manganese fluorophosphate containing lithium or sodium can be used as an electrode material. That is, a positive electrode material for a lithium/sodium battery is provided, in which intercalation/deintercalation of sodium/lithium ions is possible due to a short lithium diffusion distance caused by nanosizing of particles. Furthermore, a positive electrode material for a lithium/sodium battery is provided, which has electrochemical activity due to an increase in electrical conductivity by effective carbon coating.

8 Claims, 6 Drawing Sheets

POSITIVE ELECTRODE MATERIAL FOR SECONDARY BATTERY AND METHOD FOR MANUFACTURING THE SAME

CROSS-REFERENCE TO RELATED APPLICATION

This application claims under 35 U.S.C. §119(a) the benefit of Korean Patent Application No. 10-2011-0051912 filed May 31, 2011, the entire contents of which are incorporated herein by reference.

BACKGROUND (a) Technical Field

The present invention relates to a positive electrode material for a secondary battery. More particularly, it relates to a positive electrode material for a secondary battery and a method for manufacturing the same, in which manganese fluorophosphate containing lithium or sodium can be used as an electrode material.

(b) Background Art

With the proliferation of portable electrical and electronic devices, new secondary batteries such as nickel hydrogen batteries, lithium secondary batteries, etc., have been actively developed. Among them, the lithium secondary battery is a battery, in which carbon such as graphite is used as a negative electrode active material, oxide containing lithium is used as a positive electrode active material, and a non-aqueous solvent is used as an electrolyte solution. Lithium having a high ionization tendency can generate a high voltage and is thus used in the development of batteries with high energy density.

Lithium transition metal oxides are widely used as the positive electrode active material, and more than 90% of layered lithium transition metal oxides such as lithium cobalt oxides, lithium nickel oxides, multi-component metal oxides (e.g., cobalt-nickel-manganese ternary system), etc., are used.

However, in the layered lithium transition metal oxides widely used as the positive electrode active material, oxygen separated from a lattice participates in a reaction under abnormal conditions (such as overcharge and high temperature), thus causing abnormal behaviors such as a fire in the battery. In order to overcome the drawbacks of the layered lithium transition metal oxides, extensive research aimed at developing a positive electrode active material having spinel and olivine structures has been pursued.

As a means for solving the problem of the lithium secondary battery, such as a reduction in the safety due to the deterioration of the positive electrode, the use of spinel-type lithium manganese oxides having a three dimensional pathway for lithium ion transport and polyanion-type lithium metal phosphates having an olivine structure, instead of the layered lithium transition metal oxides, has been proposed. However, the use of the spinel-type lithium manganese oxide is limited due to release of lithium during charge and discharge and due to structural instability by Jahn-Teller distortion.

Among the olivine lithium metal phosphates, the use of lithium iron phosphate and lithium manganese phosphate as the positive electrode material has been limited due to low electrical conductivity, but they can be used as the positive electrode material as this problem has been solved by nanosizing of particles, carbon coating, etc.

Recently, fluorophosphates have been reported as the polyanion materials. The fluorophosphate has a chemical formula of $A_2MPO_4F$ where A is Li or Na and M is a transition metal such as Mn, Fe, Co, Ni, V or a mixture thereof. Since the fluorophosphate theoretically contains two sodium atoms, a theoretical capacity of about two times that of existing lithium metal phosphates is expected.

Moreover, when sodium fluorophosphate ($Na_2MPO_4F$, where M is Fe, Co, Ni, V or a mixture thereof) is used as the positive electrode material of the lithium secondary battery, sodium ions are deintercalated during initial charge and lithium ions are intercalated during initial discharge. Then, the intercalation and deintercalation reactions of lithium ions take place during the charge and discharge of the battery. Further, when the sodium fluorophosphate is used as a positive electrode material of a sodium-based battery, the intercalation and deintercalation of sodium ions occurs during the charge and discharge.

U.S. Pat. No. 6,872,492 discloses an example in which sodium fluorophosphates such as $NaVPO_4F$, $Na_2FePO_4F$, $(Na,Li)_2FePO_4F$, etc., are used as a positive electrode material of a sodium-based battery, but this patent is limited to the sodium battery, not the lithium battery.

Moreover, the structure and the electrochemical properties of sodium iron fluorophosphate ($Na_2FePO_4F$) as the positive electrode material for the lithium secondary battery have been disclosed. However, the sodium iron fluorophosphate has a charge/discharge potential of about 3.5 V, which is as low as that of iron-containing olivines. Moreover, the sodium manganese fluorophosphate ($Na_2MnPO_4F$) has a potential higher than that of the sodium iron fluorophosphate, but the low electrical conductivity of manganese-containing polyanions leads to electrochemical inactivity.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a positive electrode material for a secondary battery and a method for manufacturing the same, in which manganese fluorophosphate containing lithium or sodium can be used as an electrode material. Moreover, the present invention provides a positive electrode material for a lithium/sodium battery, in which intercalation/deintercalation of sodium/lithium ions is possible due to a short lithium diffusion distance caused by nanosizing of particles. Furthermore, the present invention provides a positive electrode material for a lithium/sodium battery, which has electrochemical activity due to an increase in electrical conductivity by effective carbon coating.

In one aspect, the present invention provides a positive electrode material for a secondary battery, the positive electrode material having a particle size of about 1 to about 100 nm, exhibiting a potential plateau during discharge between about 3.7 to about 4.0 V, coated with carbon to improve conductivity, and comprising a compound represented by the following formula 1:

$$A_xMnPO_4F \qquad [1]$$

wherein A is lithium (Li), sodium (Na), or a mixture thereof and $0<x\leq 2$.

In another aspect, the present invention provides a method for manufacturing a positive electrode material for a secondary battery, the method comprising: a pretreatment step, in which a lithium (Li) oxide or a precursor thereof, a manganese (Mn) oxide or a precursor thereof, a phosphorus (P) oxide or a precursor thereof, and a fluoride (F) or a precursor thereof are uniformly mixed using a mixing device such as, e.g., a ball mill, to form a mixture; and a heat treatment step, in which a carbon material is added to the mixture obtained from the pretreatment and uniformly mixed using, e.g., the ball mill, and the resulting mixture is sintered.

In still another aspect, the present invention provides a method for manufacturing a positive electrode material for a secondary battery, the method comprising: a pretreatment step, in which a sodium (Na) oxide or a precursor thereof, a manganese (Mn) oxide or a precursor thereof, a phosphorus (P) oxide or a precursor thereof, and a fluoride (F) or a precursor thereof are uniformly mixed using a mixing device, e.g., a ball mill, to form a mixture; and a heat treatment step, in which a carbon material is added to the mixture obtained from the pretreatment and uniformly mixed using, e.g., the ball mill, and the resulting mixture is sintered.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present invention provides a positive electrode material for a lithium secondary battery comprising a compound represented by the following formula 1:

$$A_xMnPO_4F \qquad [1]$$

wherein A is lithium (Li), sodium (Na), or a mixture thereof and $0<x\leq2$.

Especially, the positive electrode material of the present invention is a powder having a particle size of about 1 to about 100 nm, exhibits a potential plateau during discharge between about 3.7 to about 4.0 V, and is coated with carbon.

A method for manufacturing a positive electrode material for a secondary battery according to the present invention will be described below, and the present invention will be more readily understood by the following examples.

First, when lithium is used in the positive electrode material of the present invention, the positive electrode material for a secondary battery is manufactured by a pretreatment process, in which a lithium (Li) oxide or a precursor thereof, a manganese (Mn) oxide or a precursor thereof, a phosphorus (P) oxide or a precursor thereof, and a fluoride (F) or a precursor thereof are uniformly mixed using a mixing device, e.g., a ball mill, to form a mixture, and by a heat treatment process, in which a carbon material is added to the mixture obtained from the pretreatment and uniformly mixed using, e.g., the ball mill, and the resulting mixture is sintered.

Moreover, when sodium is used in the positive electrode material of the present invention, the positive electrode material for a secondary battery is manufactured by a pretreatment process, in which a sodium (Na) oxide or a precursor thereof, a manganese (Mn) oxide or a precursor thereof, a phosphorus (P) oxide or a precursor thereof, and a fluoride (F) or a precursor thereof are uniformly mixed using a mixing device, e.g., a ball mill, to form a mixture, and by a heat treatment process, in which a carbon material is added to the mixture obtained from the pretreatment and uniformly mixed using, e.g., the ball mill, and the resulting mixture is sintered.

Furthermore, a reheat treatment process, in which the thus obtained positive electrode material is uniformly mixed with another carbon conductive material and reheated at a temperature of about 400 to about 800° C., is further performed.

The composition of the positive electrode material of the present invention may vary according to the above formula 1 and the positive electrode material of the present invention is not limited to a particular composition.

The precursor of the lithium oxide may include, but is not limited to, lithium phosphate, lithium carbonate, lithium hydroxide, lithium acetate, lithium sulfate, lithium sulfite, lithium fluoride, lithium chloride, lithium bromide, lithium iodide, or a mixture thereof.

The precursor of the sodium oxide may include, but is not limited to, sodium phosphate, sodium carbonate, sodium hydroxide, sodium acetate, sodium sulfate, sodium sulfite, sodium fluoride, sodium chloride, sodium bromide, or a mixture thereof.

The precursor of the manganese oxide may include, but is not limited to, manganese metal, manganese oxide, manganese oxalate, manganese acetate, manganese nitrate, or a mixture thereof.

The precursor of the phosphorus oxide may include, but is not limited to, lithium phosphate, sodium phosphate, potassium phosphate, or a mixture thereof.

The precursor of the fluorine may include, but is not limited to, metal fluoride, fluoride, or a mixture thereof.

The carbon conductive material may include, but is not limited to, citric acid, sucrose, Super-P, acetylene black, ketjen black, carbon, or a mixture thereof.

Here, it is possible to control the size of particles by adding a carbon conductive material, and thus it is possible to inhibit particle growth during reaction. Moreover, the residual carbon particles after the reaction are uniformly distributed between the particles of the positive electrode material, serving as a conductive material.

The positive electrode material of the present invention manufactured in the above-described manner can be used to manufacture a lithium secondary battery. Here, the lithium secondary battery can be manufactured in the same manner as conventional lithium secondary batteries, except that different positive electrode materials are used, and the configuration of the lithium secondary battery and manufacturing method thereof will be briefly described below.

First, a process of manufacturing a positive electrode plate using the positive electrode material of the present invention is as follows. The positive electrode material, as a powder, is mixed with at least one additive selected from the group consisting of a conductive material, a binder, a filler, a dispersant, an ion conductive material, and a pressure increasing agent, which are commonly used in the art. Then, an appropriate solvent (e.g., organic solvent) is added to the mixture to form a slurry or paste. The thus obtained slurry or paste is applied to an electrode support substrate using, e.g., a doctor blade, and the resulting substrate is dried and then pressed by, e.g., a roll press, thereby manufacturing the final positive electrode plate.

Examples of the conductive material may include, but are not limited to, graphite, carbon black, acetylene black, ketjen black, carbon fiber, metal powder, and a mixture thereof. The binder may include, but is not limited to, polyvinylidene fluoride (PVdF), polyethylene, etc. The electrode support substrate (also called a current collector) may be formed of a foil or sheet of silver, copper, nickel, stainless steel, or aluminum, or formed of carbon fibers.

The lithium secondary battery may be manufactured using the thus manufactured positive electrode. The lithium secondary battery may have any shape such as coin, button, sheet, cylinder, or prism. The lithium secondary battery of the present invention may include a negative electrode, an electrolyte, a separator, etc., which are the same as those of the conventional lithium secondary battery.

The negative electrode active material may include at least one complex oxide of transition metals including lithium. Besides silicon, tin, etc., may be used as the negative electrode active material.

The electrolyte may include, but is not limited to, a non-aqueous electrolyte prepared by dissolving a lithium salt in an organic solvent, an inorganic solid electrolyte, and a complex of inorganic solid electrolytes. The solvent of the non-aqueous electrolyte may include at least one selected from the group consisting of esters such as ethylene carbonate, propylene carbonate, dimethyl carbonate, diethyl carbonate, methyl ethyl carbonate, etc., lactones such as butyl lactone, etc., ethers such as 1,2-dimethoxyethane, ethoxy-methoxy ethanol, etc., and nitriles such as acetonitrile, etc. The examples of the lithium salt of the non-aqueous electrolyte may include, but not limited to, lithium hexafluoroarsenate ($LiAsF_6$), lithium tetrafluoroborate ($LiBF_4$), lithium hexafluorophosphate ($LiPF_6$), etc. The separator may be formed of a porous material such as porous film, non-woven fabric, etc., prepared from polyolefin such as polypropylene (PP) and/or polyethylene (PE).

Next, the present invention will be described in detail with reference to Examples. However, the scope of the present invention is not limited to the following Examples.

Example 1

A total of 10 g of sodium carbonate ($NaHCO_3$), manganese oxalate.hydrate ($MnC_2O_4.2H_2O$), sodium fluoride (NaF), sodium bicarbonate ($NaHCO_3$) and ammonium phosphate ($NH_4H_2PO_4$) in predetermined amounts were uniformly mixed by ball milling for about 6 hours to form a mixture. The thus obtained mixture was subjected to pretreatment under air atmosphere at about 300° C. for about 2 hours, and 20 wt % citric acid as a carbon conductive material was added thereto. Then, the resulting mixture was subjected to wet ball-milling using hexane as a solvent for about 24 hours.

Subsequently, the mixture was collected after the wet ball-milling and sintered under argon atmosphere at about 500° C. for about 6 hours. The thus prepared positive electrode material was uniformly mixed with Super-P in a ratio of about 75:25 using a ball mill and the resulting mixture was subjected to reheat treatment, thus manufacturing a positive electrode composite material.

Comparative Example 1

A total of 5g of sodium carbonate ($NaHCO_3$), manganese oxalate.hydrate ($MnC_2O_4.2H_2O$), sodium fluoride (NaF), sodium bicarbonate ($NaHCO_3$) and ammonium phosphate ($NH_4H_2PO_4$) in predetermined amounts were uniformly mixed by hand for about 30 minutes.

The thus obtained mixture was subjected to pretreatment under air atmosphere at 300° C. for 2 hours and then sintered under argon atmosphere at about 600° C. for about 6 hours. The thus prepared positive electrode material was uniformly mixed with Super-P in a ratio of about 75:25 by ball milling and the resulting mixture was subjected to reheat treatment, thus manufacturing a positive electrode composite material.

Comparative Example 2

A total of 5g of sodium carbonate ($NaHCO_3$), manganese oxalate.hydrate ($MnC_2O_4.2H_2O$), sodium fluoride (NaF), sodium bicarbonate ($NaHCO_3$) and ammonium phosphate ($NH_4H_2PO_4$) in predetermined amounts were uniformly mixed by hand for about 30 minutes.

The thus obtained mixture was subjected to pretreatment under air atmosphere at about 300° C. for about 2 hours and then sintered under argon atmosphere at about 500° C. for about 6 hours. The thus prepared positive electrode material was uniformly mixed with Super-P in a ratio of about 75:25 by ball milling and the resulting mixture was subjected to reheat treatment, thus manufacturing a positive electrode composite material.

Comparative Example 3

A total of 10 g of sodium carbonate ($NaHCO_3$), manganese oxalate.hydrate ($MnC_2O_4.2H_2O$), sodium fluoride (NaF), sodium bicarbonate ($NaHCO_3$) and ammonium phosphate ($NH_4H_2PO_4$) in predetermined amounts were uniformly mixed by ball milling for 6 hours.

The thus obtained mixture was subjected to pretreatment under air atmosphere at about 300° C. for about 2 hours and then sintered under argon atmosphere at about 600° C. for about 6 hours. The thus prepared positive electrode material was uniformly mixed with Super-P in a ratio of about 75:25 by ball milling and the resulting mixture was subjected to reheat treatment, thus manufacturing a positive electrode composite material.

Comparative Example 4

A total of 10 g of sodium carbonate ($NaHCO_3$), manganese oxalate.hydrate ($MnC_2O_4.2H_2O$), sodium fluoride (NaF), sodium bicarbonate ($NaHCO_3$) and ammonium phosphate ($NH_4H_2PO_4$) in predetermined amounts were uniformly mixed by ball milling for about 6 hours.

The thus obtained mixture was subjected to pretreatment under air atmosphere at about 300° C. for about 2 hours and then sintered under the same conditions as Example 1, without the addition of the carbon conductive material and the ball milling. The thus prepared positive electrode material was uniformly mixed with Super-P in a ratio of v75:25 by ball milling and the resulting mixture was subjected to reheat treatment, thus manufacturing a positive electrode composite material.

Test Example: Evaluation of Electrode Performance

The positive electrode materials as powders prepared in Examples 1 and Comparative Examples 1 and 2 were used. 95 wt % positive electrode composite material and 5 wt % polyvinylidene fluoride (PVdF) as a binder were mixed to prepare slurries using N-methylpyrrolidone (NMP) as a solvent. Each slurry was coated on an aluminum foil having a thickness of about 20 μm, and the resulting foil was dried and pressed by a roll press. Then, the resulting foil was dried under vacuum at a temperature of about 120° C. for about 16 hours to prepare a disk-shaped electrode having a diameter of 16 mm.

A punched lithium metal foil having a diameter of 16 mm was used as a counter electrode, and a polypropylene (PP) film was used as a separator. A mixed solution of 1 M $LiPF_6$ and ethylene carbonate/dimethoxyethane (EC/DME) (1:1, v/v) was used as an electrolyte. After the separator was immersed in the electrolyte, the resulting separator was inserted between the working electrode and the counter electrode to evaluate the electrode performance using a stainless steel case as a test cell for the evaluation. The measurement results including discharge capacity are shown in the following Table 1:

TABLE 1

| | Composition analysis results (molar ratio) | | | Discharge capacity at room temperature (mAh/g$^{-1}$) | Discharge voltage (V) |
|---|---|---|---|---|---|
| | Na | Mn | $PO_4$ | | |
| Example 1 | 2.0 | 1.0 | 1.0 | 74 | 2.0 |
| | | | | 124 | 1.0 |
| Comparative Example 1 | 2.0 | 1.0 | 1.0 | 57 | 2.0 |

As a result of the evaluation of electrochemical properties, when the particle size was about 50 μm or greater, the charge/discharge reaction hardly occurred, and a discharge capacity of 30 mAh/g$^{-1}$ was observed at the particle size of about 2 μm, from which it can be seen that the discharge capacity increased as the particle size decreased.

Figure 3:
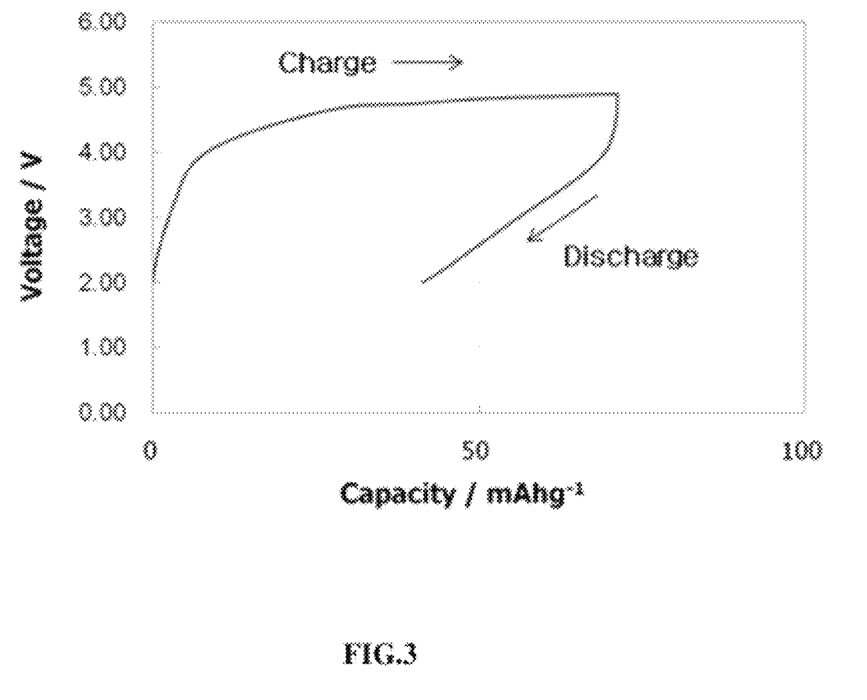
FIG. 3 shows a charge/discharge curve, obtained at room temperature, of a battery comprising a positive electrode material prepared in Comparative Example 2.
Figure 4:
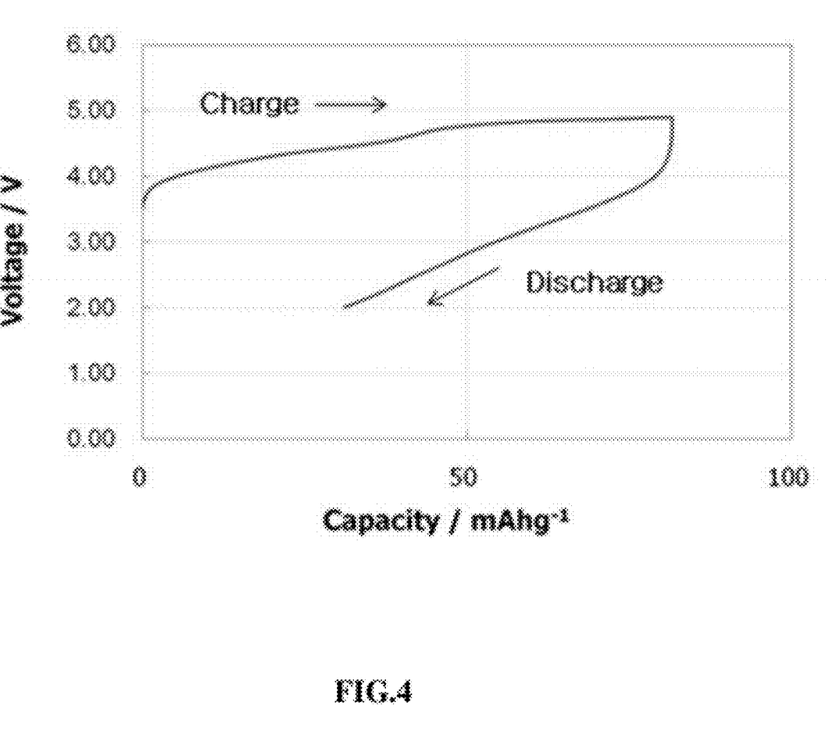
FIG. 4 shows a charge/discharge curve, obtained at room temperature, of a battery comprising a positive electrode material prepared in Comparative Example 4.

Moreover, as can be seen in FIGS. 3 and 4, which show the charge/discharge curves, obtained at room temperature, of the batteries comprising the positive electrode materials prepared in Comparative Examples 2 and 4, the discharge capacity increased as the particle size of the positive electrode material decreased. However, no potential plateau was observed, which was probably caused by increased polarization resistance.

Figure 5:
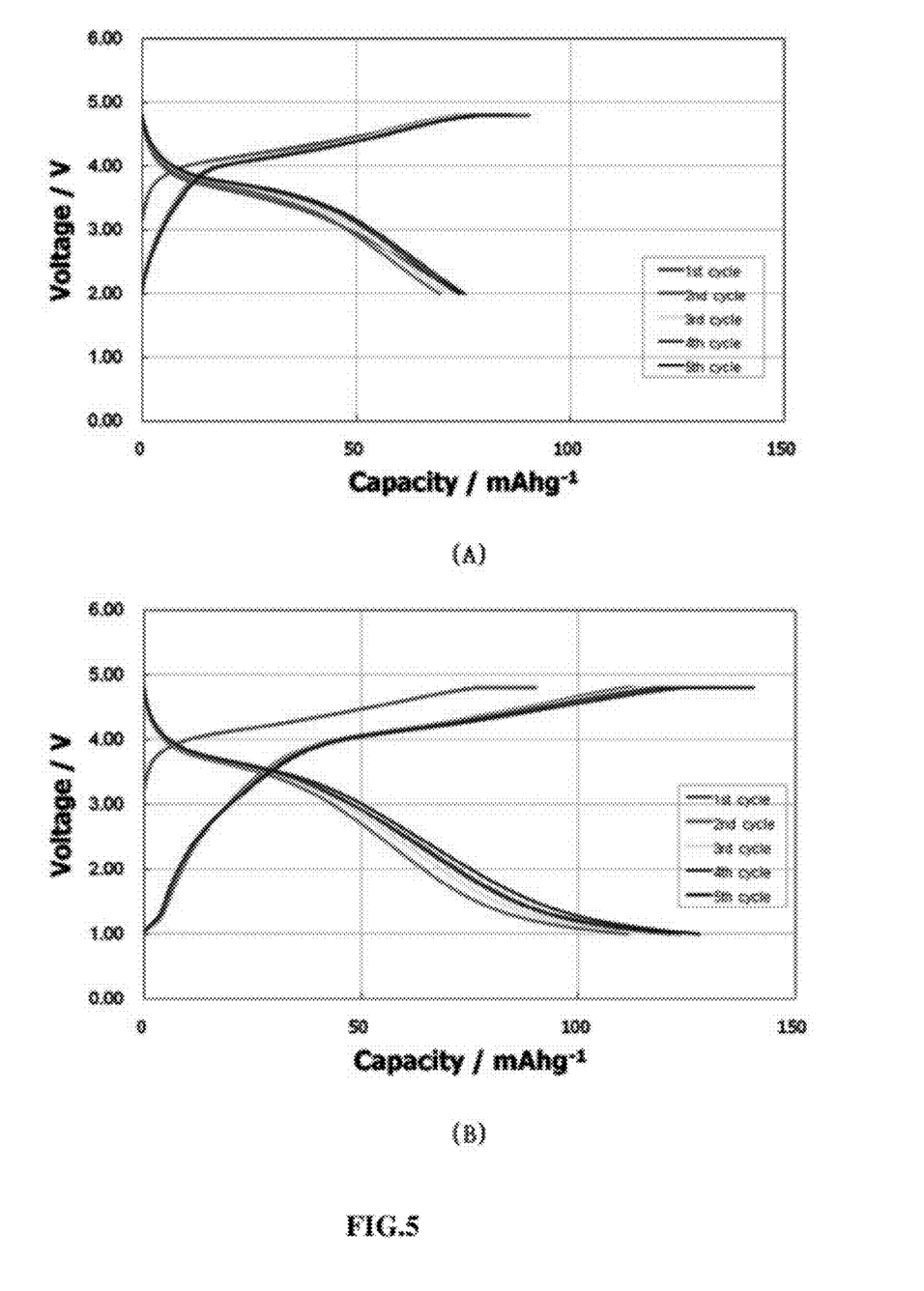
FIGS. 5A and 5B show charge/discharge curves, obtained at room temperature, of a battery comprising a positive electrode material prepared in Example 1, in which the discharge cut-off voltage is 2.0 V in FIG. 5A and 1.0 V in FIG. 5B.

On the contrary, as can be seen from FIGS. 5A and 5B, which show the charge/discharge curves, obtained at room temperature, of the battery comprising the positive electrode material prepared in Example 1, in which the discharge cut-off voltage is 2.0 V in FIG. 5A and 1.0 V in FIG. 5B, the capacity corresponding to 3.0 V or higher Example 1 was greater than that of Comparative Examples 1 and 2, and thus it is possible to obtain a higher energy density when the positive electrode material of Example 1 is used in a battery. Moreover, it can be seen that there was less polarization as the potential plateau was observed at about 3.9 V.

Figure 6:
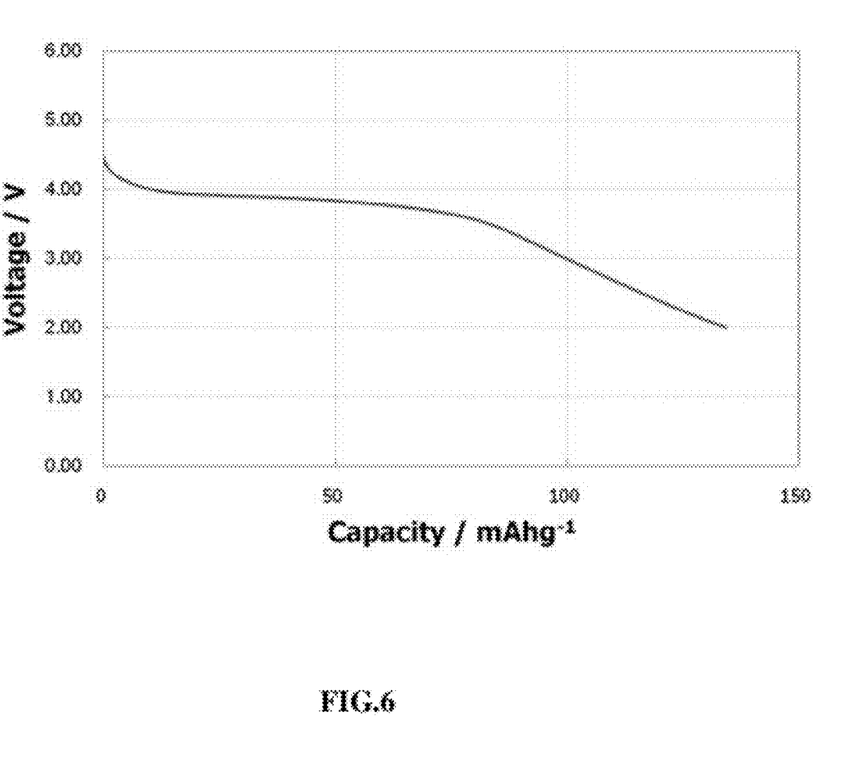
FIG. 6 shows a discharge curve, obtained at a temperature of 60° C., of a battery comprising a positive electrode material prepared in Example 1.

Moreover, as can be seen from FIG. 6, which shows the discharge curve, obtained at a temperature of about 60° C., of the battery comprising the positive electrode material prepared in Example 1, a potential plateau of about 3.9 V was observed, and the capacity caused by the potential plateau was about 80 mAh/g$^{-1}$, from which it can be seen that the battery exhibits improved electrochemical properties. Therefore, it can be seen that the positive electrode material of the present invention having a primary particle size of about 100 nm or smaller and prepared by carbothermal reduction exhibits an energy density 2.5 times higher than that of the positive electrode material (with a primary particle size above 300 nm) prepared by solid-state reduction.

Figure 1:
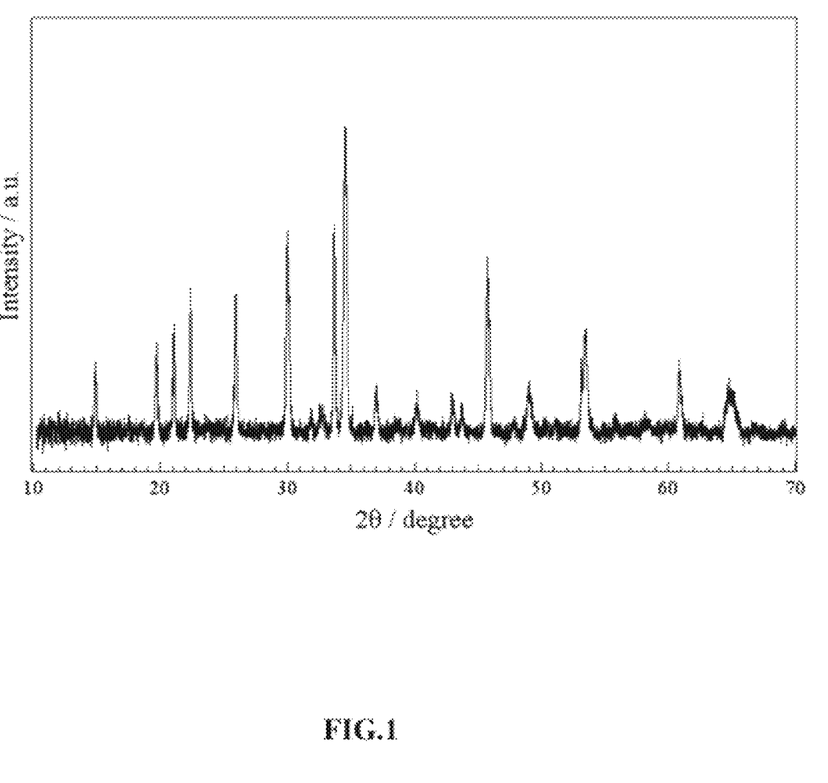
FIG. 1 is an x-ray diffraction (XRD) graph of a lithium manganese fluorophosphate positive electrode material for a lithium secondary battery prepared in Example 1 of an exemplary embodiment of the present invention.
Figure 2:
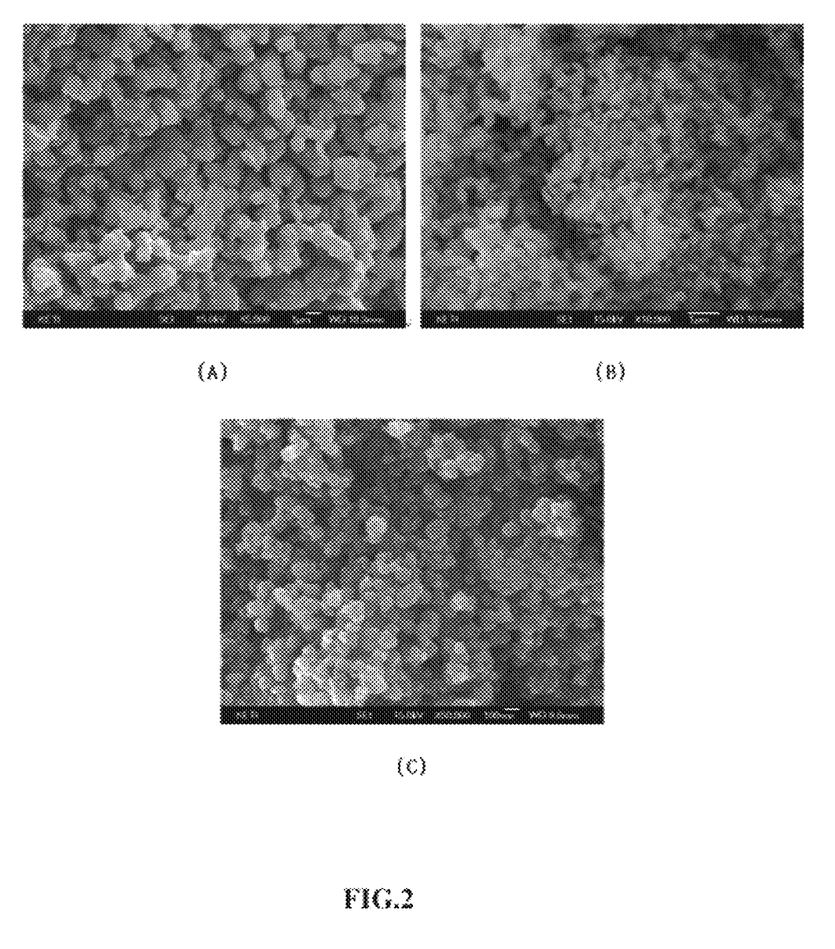
FIGS. 2A to 2C show electron microscope images of positive electrode materials prepared in Example 1 (FIG. 2C), Comparative Example 2 (FIG. 2A), and Comparative Example 4 (FIG. 2B)

The composition of the metals in the positive electrode material prepared in Example 1 was measured by inductively coupled plasma (ICP) emission spectroscopy analysis and the results are shown in the following Table 2. The results of the x-ray diffraction (XRD) analysis on the positive electrode material are shown in FIG. 1, and the electron microscope images of the positive electrode materials are shown in FIGS. 2A to 2C.

TABLE 2

| | Primary particle size | Discharge capacity at room tem. (mAh/g–$^1$) | Energy density (Wh/kg) | Potential plateau | Discharge voltage (V) |
|---|---|---|---|---|---|
| Example 1 | <100 nm | 74 | 244 | ◯ | 2.0 |
| | | 124 | 308 | ◯ | 1.0 |

TABLE 2-continued

|  | Primary particle size | Discharge capacity at room tem. (mAh/g$^{-1}$) | Energy density (Wh/kg) | Potential plateau | Discharge voltage (V) |
|---|---|---|---|---|---|
|  |  | 134 (60° C.) | 463 | ○ | 2.0 |
| Comparative Example 1 | 5 μm | 5 | 17 | X | 2.0 |
| Comparative Example 2 | 2 μm | 30 | 90 | X | 2.0 |
| Comparative Example 3 | 1 μm | 35 | 106 | X | 2.0 |
| Comparative Example 4 | 300 nm | 57 | 182 | X | 2.0 |

Therefore, it can be seen that the primary particle size of the positive electrode materials prepared by solid-state reduction in Comparative Examples can be controlled to 300 nm by process control, the controllable particle size is not limited to 300 nm, and the particle size can be controlled to be smaller by process control.

Moreover, when the prepared positive electrode material has a uniform shape and a particle size of about 100 nm or smaller, excellent electrochemical properties are exhibited. Therefore, referring to FIGS. 2A to 2C showing the electron microscope images of the positive electrode materials prepared in Example 1 (FIG. 2C), Comparative Example 2 (FIG. 2A), and Comparative Example 4 (FIG. 2B), it can be seen that the positive electrode materials in Comparative Examples 1 to 4 have a particle size greater than that of the positive electrode material in Example 1, and thus the exhibition of electrochemical properties is limited. On the contrary, in the case of Example 1, the intercalation and deintercalation of lithium or sodium ions are facilitated due to the diffusion distance of lithium or sodium ions reduced by the small particle size, thereby reducing the polarization and improving the capacity As described above, the present invention provides the following effects.

The positive electrode material according to the present invention has a primary particle size of 100 nm or smaller and thus can reduce the diffusion distance of lithium or sodium ions. Moreover, the positive electrode material exhibits excellent electrochemical properties of the positive electrode and facilitates the intercalation and deintercalation of lithium or sodium ions. Especially, when the positive electrode material of the present invention is used in the positive electrode for a secondary battery, a discharge voltage of about 3.8 V (with respect to lithium) can be obtained.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a positive electrode material for a secondary battery having a particle size of about 1 to about 100 nm, exhibiting a potential plateau during discharge between about 3.7 to about 4.0 V, coated with carbon to improve conductivity and comprising a compound represented by [Formula 1], the method comprising:

pretreating a mixture which is formed by uniformly mixing a lithium (Li) oxide or a precursor thereof, and/or a sodium (Na) oxide or a precursor thereof, a manganese (Mn) oxide or a precursor thereof, a phosphorus (P) oxide or a precursor thereof, and as fluoride (F) or a precursor thereof using a mixing device; and heat treating the mixture with a first carbon conductive material which is added to the mixture obtained after pretreating and uniformly mixed with the mixture using the mixing device, wherein the resulting mixture thereof is sintered:

[Formula 1] A$_x$MnPO$_4$F wherein A is lithium (Li), sodium (Na), or a mixture thereof and 0<x≤2, wherein in pretreating, the mixture is uniformly mixed using a ball mill for 6 hours and subjected to pretreatment under air atmosphere at 300° C. for 2 hours, wherein the first carbon conductive material is citric acid.

2. The method of claim 1, wherein heat treating comprises:

mixing the first carbon conductive material with the mixture obtained from pretreating and performing wet ball-milling;

collecting the resulting mixture after the wet ball-milling and sintering the resulting mixture under argon atmosphere; and uniformly mixing the sintered mixture with a second carbon conductive material in a predetermined ratio and reheating thereof.

3. The method of claim 2, wherein the sintered mixture is washed with water and dried, the sintered mixture is uniformly mixed with the second carbon conductive material, and reheating is performed at a temperature of about 200 to 500° C.

4. The method of claim 1, wherein the precursor of the lithium oxide is lithium phosphate, lithium carbonate, lithium hydroxide, lithium acetate, lithium sulfate, lithium sulfite, lithium fluoride, lithium chloride, lithium bromide, lithium iodide, or a mixture thereof.

5. The method of claim 1, wherein the precursor of the manganese oxide is manganese metal, manganese oxide, manganese oxalate, manganese acetate, manganese nitrate, or a mixture thereof.

6. The method of claim 1, wherein the precursor of the phosphorus oxide is ammonium phosphate, sodium phosphate, potassium phosphate, or a mixture thereof.

7. The method of claim 1, wherein the second carbon conductive material is citric acid, sucrose, Super-P, acetylene black, ketjen black, carbon, or a mixture thereof.

8. The method of claim 1, wherein the mixing device is a ball mill.

* * * * *